(12) United States Patent
Park et al.

(10) Patent No.: US 10,817,120 B2
(45) Date of Patent: Oct. 27, 2020

(54) ELECTRONIC DEVICE

(71) Applicant: Samsung Display Co., Ltd., Yongin-Si, Gyeonggi-Do (KR)

(72) Inventors: Yong-Hwan Park, Cheonan-si (KR); Miyoung Kim, Daegu (KR); Soyeon Park, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/421,403

(22) Filed: May 23, 2019

(65) Prior Publication Data

US 2020/0026375 A1    Jan. 23, 2020

(30) Foreign Application Priority Data

Jul. 17, 2018  (KR) .................... 10-2018-0082929

(51) Int. Cl.
*G06F 3/044* (2006.01)
*G02F 1/1333* (2006.01)
*G06F 3/041* (2006.01)

(52) U.S. Cl.
CPC .......... *G06F 3/044* (2013.01); *G02F 1/13338* (2013.01); *G06F 3/0412* (2013.01); *G06F 2203/04111* (2013.01)

(58) Field of Classification Search
CPC ...... G06F 3/0443; G06F 3/044; G06F 3/0446; G06F 3/0448; G06F 3/0412; G06F 2203/04111
See application file for complete search history.

(56) References Cited

U.S. PATENT DOCUMENTS

| 9,645,695 | B2 | 5/2017 | Orita et al. | |
|---|---|---|---|---|
| 10,126,864 | B2 | 11/2018 | Jeong et al. | |
| 2015/0293560 | A1* | 10/2015 | Choi | G06F 3/044 |
| | | | | 345/174 |
| 2017/0075449 | A1 | 3/2017 | Ko et al. | |
| 2018/0122867 | A1* | 5/2018 | Choe | G06F 3/0412 |
| 2018/0190723 | A1* | 7/2018 | Han | G06F 3/044 |
| 2019/0018530 | A1* | 1/2019 | Lee | G06F 3/0412 |
| 2019/0129551 | A1* | 5/2019 | Lee | G06F 3/0412 |

FOREIGN PATENT DOCUMENTS

| JP | 5844002 B2 | 1/2016 |
|---|---|---|
| KR | 10-2017-0131755 A | 5/2005 |

* cited by examiner

*Primary Examiner* — Dennis P Joseph
(74) *Attorney, Agent, or Firm* — Innovation Counsel LLP

(57) ABSTRACT

Provided is an electronic device. The electronic device includes a display member and a touch member. The touch member sensing patterns disposed to be spaced apart from each other and trace lines respectively connected to the sensing patterns to extend in a first direction and arranged in a second direction crossing the first direction. Each of the sensing patterns includes sensing lines, and connection patterns connected to the sensing lines. Each of the sensing lines includes first patterns, second patterns, and protrusion patterns, which extend in directions crossing each other. Each of the first patterns and the second patterns overlaps at least two light emitting area adjacent to each other in the extension direction when viewed in a direction crossing the extension direction.

20 Claims, 13 Drawing Sheets

ELECTRONIC DEVICE

CROSS-REFERENCE TO RELATED APPLICATIONS

This U.S. non-provisional patent application claims priority under 35 U.S.C. § 119 of Korean Patent Application No. 10-2018-0082929, filed on Jul. 17, 2018, the entire contents of which are hereby incorporated by reference.

BACKGROUND

The present disclosure herein relates to an electronic device, and more particularly, to an electronic device having improved visibility and a method for manufacturing the same.

In general, electronic devices receive an electrical signal to be activated. Such an electronic device may include an electronic unit displaying an image, or a touch screen detecting touch applied from outside of the device.

The electronic device may include various electrode patterns so as to be activated by an electrical signal. An area on which the electrode patterns are activated may display information or respond to touch applied from outside the device.

SUMMARY

The present disclosure provides an electronic device that is capable of preventing touch sensors from being seen by reflection of external light.

An embodiment of the inventive concept provides an electronic device including: a display member divided into a plurality of light emitting area spaced apart from each other on a plane and peripheral areas adjacent to the light emitting areas and including a plurality of display elements respectively disposed on the light emitting areas and configured to generate light; and a touch member disposed on the display member and configured to detect an input applied from the outside, wherein the touch member includes a plurality of sensing patterns disposed to be spaced apart from each other and a plurality of trace lines respectively connected to the sensing patterns to extend in a first direction and arranged in a second direction crossing the first direction, wherein each of the sensing patterns includes a plurality of sensing lines extending in the first direction and arranged in the second direction and connection patterns disposed between the sensing lines adjacent to each other to connect the sensing lines to each other, wherein each of the sensing lines includes: a plurality of first patterns extending in a third direction crossing each of the first direction and the second direction and arranged in the first direction; second patterns extending in a fourth direction crossing each of the first direction, the second direction, and the third direction and disposed alternately with the first patterns in the first direction so as to be connected to the two first patterns adjacent to each other; and protrusion patterns respectively connected to the first patterns and the second patterns to extend in a direction crossing the extension direction of the connected patterns, wherein each of the first patterns and the second patterns overlaps at least two light emitting area adjacent to each other in the extension direction when viewed in a direction crossing the extension direction.

In an embodiment, the number of connection patterns disposed between the sensing lines adjacent to each other may be equal to or less than 10% of the number of sensing lines disposed within one sensing pattern of the sensing patterns.

In an embodiment, the number of light emitting areas overlapping each of the first patterns and the second patterns may be at most four.

In an embodiment, the trace lines may be disposed to be spaced apart from each other in the second direction, and each of the trace lines may have a same shape as one sensing line of the sensing lines.

In an embodiment, the method electronic may further include dummy patterns overlapping the peripheral areas and disposed between the sensing patterns and the trace lines, wherein each of the dummy patterns may have a same shape as each of the sensing lines.

In an embodiment, the sensing lines adjacent to each other of the sensing lines may include a plurality of openings therebetween, which are defined by the first patterns, the second patterns, and the protrusion patterns and distinguished by the connection patterns.

In an embodiment, the openings may surround the light emitting areas.

In an embodiment, the display member may include a base layer and a pixel defining layer configured to expose the light on the base layer and disposed to be spaced apart from the light emitting areas, and the sensing patterns and the trace lines may overlap the pixel defining layer.

In an embodiment, a distance between two sensing lines adjacent to each other of the sensing lines in the second direction may be less than a maximum width between two light emitting areas adjacent to each other in the second direction.

In an embodiment, each of the first pattern may include sub patterns, each of which has a length greater than a maximum width of one light emitting area of the light emitting areas, and each of the connection patterns may have a length that is greater than a width of the light emitting area and be equal to or less than a length of one sub pattern.

In an embodiment, each of the protrusion patterns may have a length that is less than half the length of the connection pattern.

In an embodiment, the sensing patterns may be arranged a matrix.

In an embodiment, the touch member may be configured to detect a position of the input by using self-capacitance of each of the sensing patterns.

In an embodiment, the touch member may be directly disposed on the display member.

In an embodiment, the sensing patterns may further include first sensing patterns and second sensing patterns, wherein the first sensing patterns may extend in the first direction and be arranged alternately with the second sensing patterns in the second direction.

In an embodiment, the touch member may detect a position of the input by using mutual-capacitance generated by the first and second patterns.

In an embodiment of the inventive concept, an electronic device includes: a display member divided into a plurality of light emitting area spaced apart from each other on a plane and peripheral areas adjacent to the light emitting areas and including a plurality of display elements respectively disposed on the light emitting areas and configured to generate light; and a touch member disposed on the display member and configured to detect an input applied from the outside, wherein the touch member includes a plurality of sensing patterns disposed to be spaced apart from each other and a plurality of trace lines respectively connected to the sensing patterns to extend in a first direction and arranged in a second direction crossing the first direction, wherein each of the sensing patterns includes: a plurality of lattice patterns connected to each other in the first direction and arranged to be spaced apart from each other in the second direction; and at least one connection pattern connecting two adjacent lattice patterns of the lattice patterns to each other in the second direction, wherein each of the lattice patterns includes a first pattern extending in a third direction crossing each of the first direction and the second direction and a second pattern extending in a fourth direction crossing the third direction and connected to one end of the first pattern in the first direction, and the lattice pattern has one end and the other end, which includes at least two light emitting areas adjacent to each other in the first direction.

In an embodiment, the lattice patterns connected to each other in the first direction may be defined as sensing lines, and the number of connection patterns disposed between the sensing lines adjacent to each other may be equal to or less than about 10% of the number of sensing lines disposed within one sensing pattern of the sensing patterns.

In an embodiment, the number of light emitting patterns provided on the one end and the other end of the lattice pattern may be at most four.

In an embodiment, the display member may include a base layer and a pixel defining layer configured to expose the light on the base layer and disposed to be spaced apart from the light emitting areas, and the sensing patterns and the trace lines may overlap the pixel defining layer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
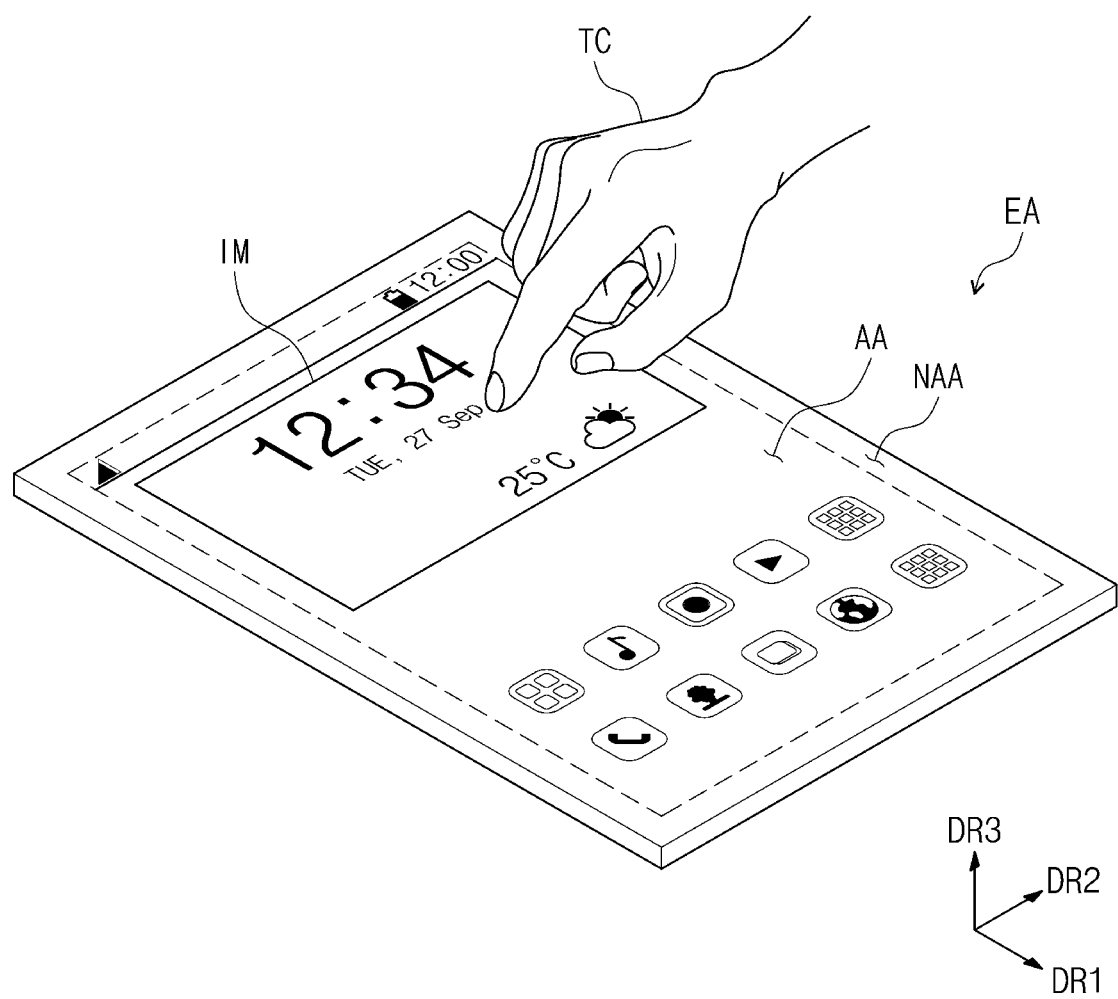
FIG. 1 is a perspective view of an electronic device according to an embodiment of the inventive concept.

In this specification, it will also be understood that when one component (or region, layer, portion) is referred to as being 'on', 'connected to', or 'coupled to' another component, it can be directly disposed/connected/coupled on/to the one component, or an intervening third component may also be present.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, "under", "below", "above', "upper", and the like are used for explaining relation association of components illustrated in the drawings. The terms may be a relative concept and described based on directions expressed in the drawings.

Unless otherwise defined, all terms (including technical and scientific terms) used herein have the same meaning as commonly understood by a person of ordinary skill in the art to which this invention belongs. Also, terms such as defined terms in commonly used dictionaries are to be interpreted as having meanings consistent with meaning in the context of the relevant art and are expressly defined herein unless interpreted in an ideal or overly formal sense.

The meaning of 'include' or 'comprise' specifies a property, a fixed number, a step, an operation, an element, a component or a combination thereof, but does not exclude other properties, fixed numbers, steps, operations, elements, components or combinations thereof. Hereinafter, exemplary embodiments of the inventive concept will be described with reference to the accompanying drawings.

Figure 2:
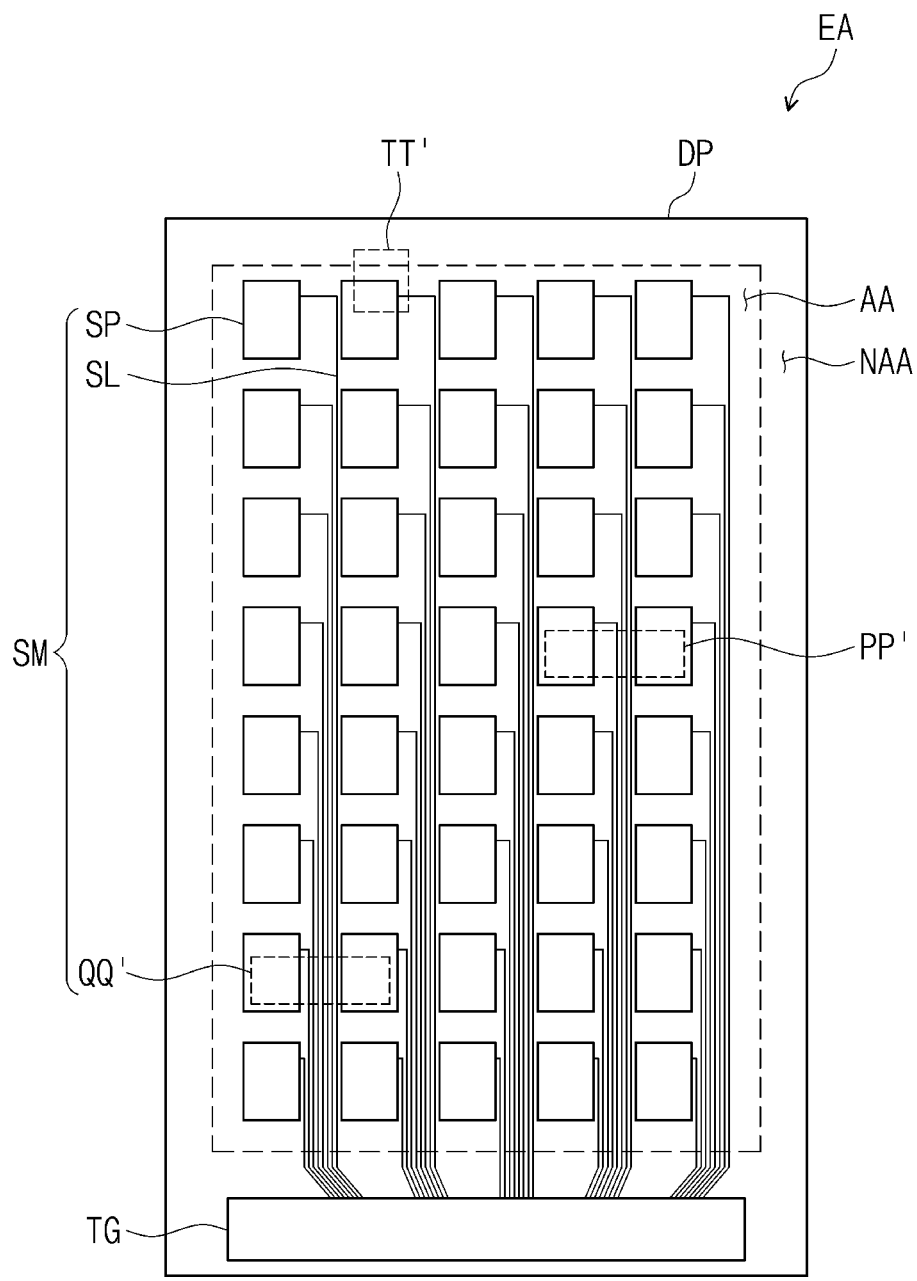
FIG. 2 is a plan view of the electronic device of FIG. 1.

FIG. 1 is a perspective view of an electronic device according to an embodiment of the inventive concept. FIG. 2 is a plan view of the electronic device of FIG. 1.

Referring to FIG. 1, an electronic device EA is activated by receiving an electrical signal. The electronic device EA may be divided into an active area AA and a non-active area NAA on a plane defined by a first direction DR1 and a second direction DR2.

The active area AA may be an area that is electrically activated when the electrical signal is supplied. The active area AA may be activated to realize various functions according to a use of the electronic device EA, described further below.

For example, the active area AA may be a sensing area that senses an input applied from outside of the device. According to an embodiment, the electronic device EA may sense an external input TC applied to the active area AA. Thus, the electronic device EA may function as an input device.

Although the external input TC is illustrated in FIG. 1 as the user' hand, the input applied from the outside may be provided in various other ways. For example, the input may include an external input applied to be in proximity to or adjacent by a predetermined distance to the electronic device EA (for example, a hovering finger above the device) as well as contact with a portion of the human body such as the user's hand. Also, the input may be provided as various forms such as force, a pressure, light, and the like and is not limited to any one embodiment.

Alternatively, the active area AA may additionally be a display area displaying predetermined information. The electronic device EA may display an image on the active area AA to allow the user to acquire information though the image. Thus, the electronic device EA may function as an output device.

The non-active area NAA is adjacent to the active area AA. The non-active area NAA may not provide a function of display an image or sensing an external input event though the electrical signal is applied.

The non-active area NNA may be an area on which signal lines for providing a signal applied from the outside to the active area AA or driving elements for driving the active area AA are disposed. The non-active area NNA may be adjacent to at least one side of the active area AA.

In this embodiment, although the non-active area NAA has a frame shape surrounding the active area AA, the present inventive concept is not limited thereto. For example, the non-active area NAA may be omitted. The non-active area NAA may have various shapes according to the shape of the active area AA and is not limited to any one embodiment.

FIG. 1 illustrates an example of a case in which the electronic device EA is provided as a touch screen. However, the present inventive concept is not limited thereto. For example, the display function of the electronic device EA may be omitted.

As illustrated in FIG. 2, the electronic device EA includes a display member DP and a touch member SM. The touch member SM includes a plurality of sensing patterns SP (hereinafter, referred to as sensing patterns), a plurality of trace lines SL (hereinafter, trace lines), and a sensing driving unit TG.

The sensing patterns SP are arranged to be spaced apart from each other on the plane. The sensing patterns SP according to an embodiment may be arranged in the form of a matrix. Although each of the sensing patterns SP of FIG. 2 has a rectangular shape, the present inventive concept is not limited thereto. For example, each of the sensing patterns SP may have a polygonal shape such as a triangular shape, a diamond shape, and the like or have a shape having a predetermined curvature such as a circular shape, an oval shape, a semicircular shape, and the like.

The trace lines SL may be connected to corresponding sensing patterns SP. Each of the trace lines SL may have one end connected to each of the corresponding sensing patterns SP and the other end connected to the sensing driving unit TG. The trace lines SL may extend in the first direction DR1 and be arranged in the second direction DR2. The trace lines SL may be made of the same material as the sensing patterns SP. The trace lines SL and the sensing patterns SP are disposed on the same layer. The trace lines SL and the sensing patterns SP may be formed through the same process.

The sensing driving unit TG may input various signals for driving the touch member SM and detect the presence or absence of the sensing and sensing coordinates by using a variation in capacitance or voltage that is measured in the sensing patterns SP. Various signals applied to the sensing driving unit TG may be applied to the sensing patterns SP through the trace lines SL, and signals sensed in the sensing patterns SP may be transmitted to the sensing driving unit TG through the trace lines SL.

According to an embodiment of the inventive concept, the touch member SM may detect information of a point at which the external input TC is applied by using self-capacitance. In self-capacitance, the capacitance may vary between the sensing pattern SP to which the external input TC is applied and the external input TC, and the measured capacitance may be transmitted to the sensing driving unit TG through the trace lines SL so that the external input TC is sensed.

The display member DP may include a base layer BSL, a pixel defining layer PDL, a display element DEM, and an encapsulation layer EC. FIG. 3C illustrates areas which correspond to a first light emitting area PXA1 and a second light emitting area PXA2 of a light emitting area PXA.

Although not shown, the base layer BSL may include a plurality of insulation layers and a plurality of conductive layers. The plurality of conductive layers and the plurality of insulation layers may constitute a thin film transistor and a capacitor, which are connected to the display element DEM.

The display element DEM is disposed on the base layer BSL. The display device DEM generates light according to the electrical signal transmitted through the thin film transistor and the capacitor to realize an image.

The display element DEM may be realized according to various embodiments. For example, the display element DEM may be an electrophoretic element, a liquid crystal capacitor, an electrowetting element, or an organic light emitting element. In this embodiment, the display element DEM may be the organic light emitting element.

The pixel defining layer PDL is disposed on the base layer BSL. Predetermined openings OP are defined in the pixel defining layer PDL. Each of the openings OP may define an area that is partitioned to define one display element DEM. Thus, light generated from the display element DEM may be exposed by the openings OP. The pixel defining layer PDL is disposed to be spaced apart from the light emitting areas PXA.

The display element DEM includes a first electrode EL1, a light emitting layer EML, and a second electrode EL2. The display element DEM may activate the light emitting layer EML according to a potential difference between the first electrode EL1 and the second electrode LE2 to generate light. Thus, the light emitting areas PXA may correspond to an area on which the light emitting layer EML is disposed.

Figure 3A:
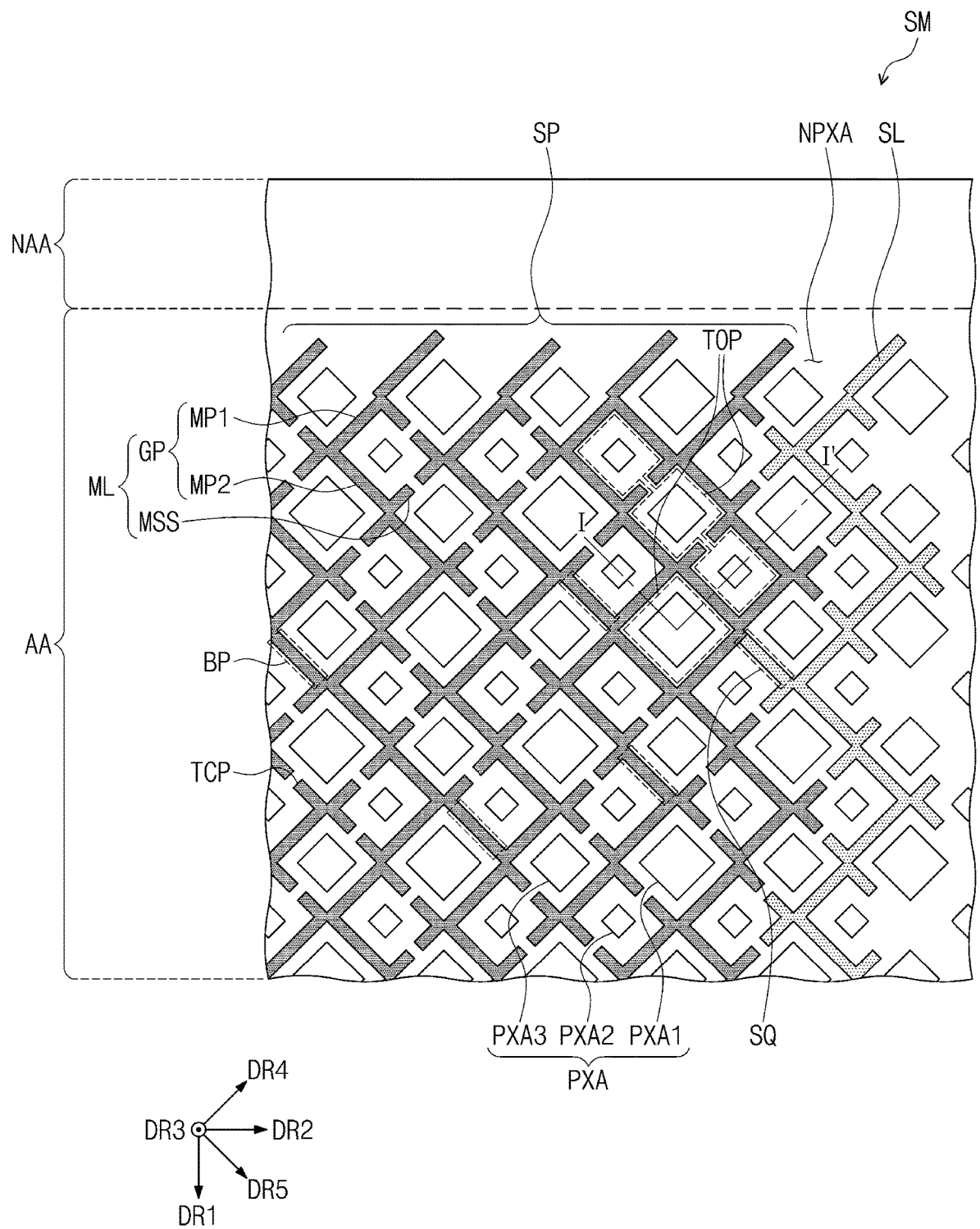
FIG. 3A is an enlarged plan view of an area TT' of FIG. 2.
Figure 3B:
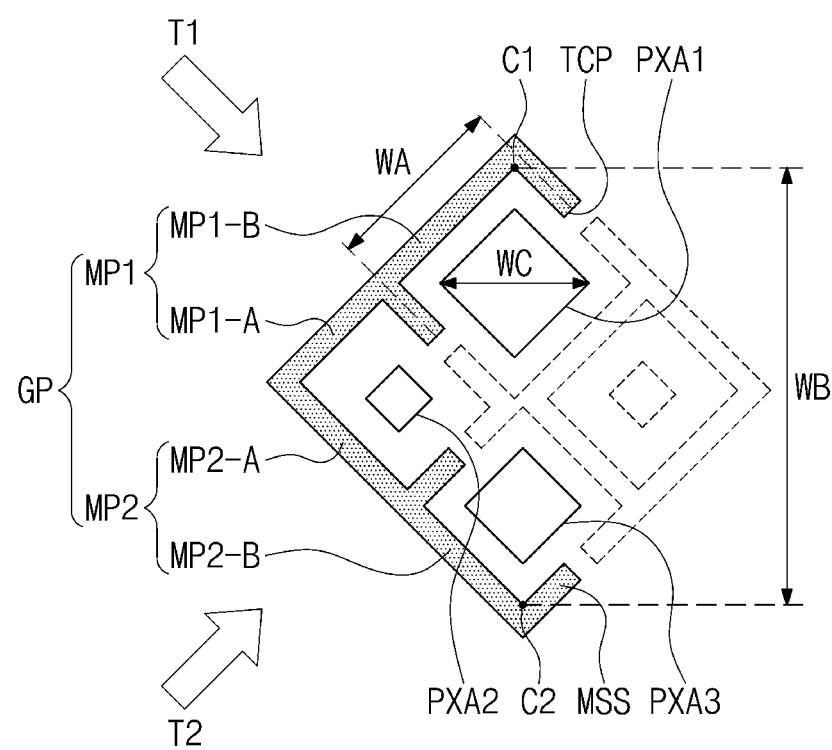
FIG. 3B is a partial plan view of an area of FIG. 3A.
Figure 3C:
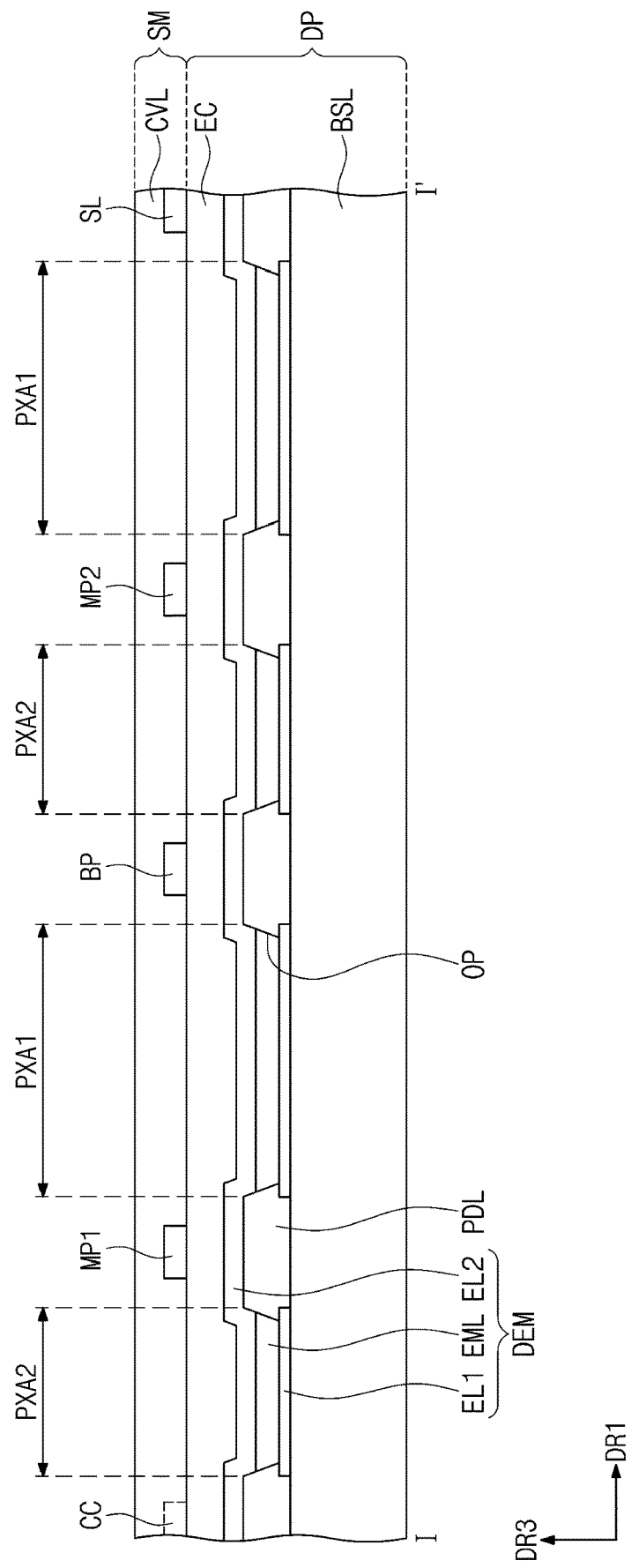
FIG. 3C is a cross-sectional view taken along line I-I' of FIG. 3A.
Figure 4:
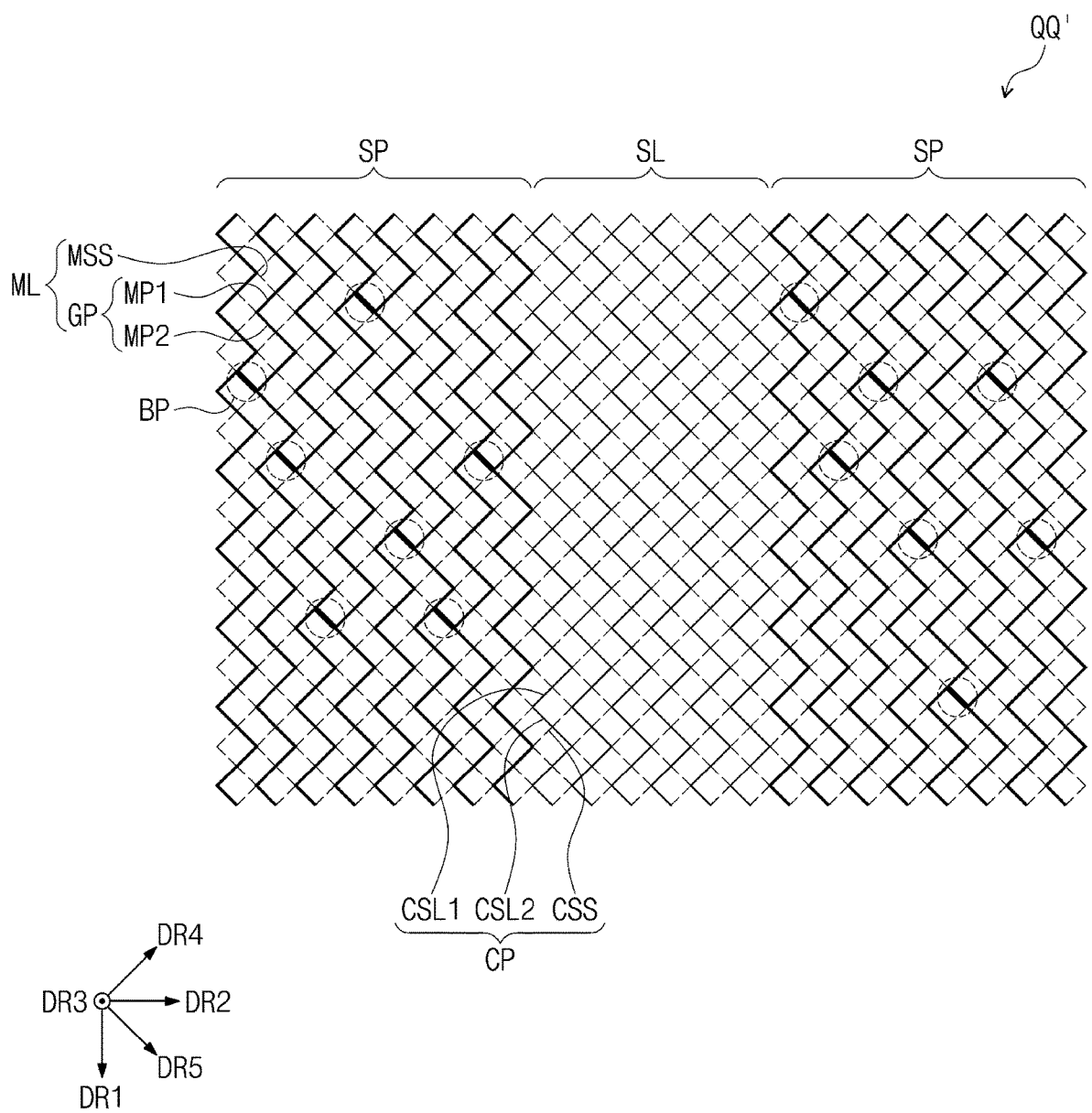
FIG. 4 is a plan view of an area QQ' of FIG. 2.

FIG. 3A is an enlarged plan view of an area TT' of FIG. 2. FIG. 3B is a partial plan view of an area of FIG. 3A. FIG. 3C is a cross-sectional view taken along line I-I' of FIG. 3A. FIG. 4 is a plan view of an area QQ' of FIG. 2. Hereinafter, a display device according to according to the inventive concept will be described with reference to FIGS. 3A to 4.

FIG. 3A is a view for explaining a substantial arrangement relationship between the display member DP and the touch member SM. For convenience of description, FIG. 3A illustrates a shape of a plane of the plurality of light emitting areas PXA together with the sensing patterns SP.

The light emitting areas PXA may display a red, green, or blue color. However, the present inventive concept is not limited thereto. For example, light emitting areas PXA may further include light emitting areas for displaying magenta, cyan, or a white color. Each of the light emitting areas PXA may have various sizes (or surface areas) according to a color to be displayed thereon. In this embodiment, the light emitting areas PXA having colors different from each other are illustrated as a first light emitting area PXA1, a second light emitting area PXA2, and a third light emitting area PXA3.

In this embodiment, the light emitting areas PXA may be arranged in a fourth direction DR4 crossing the first direction DR1 and the second direction DR2 and a fifth direction DR5 crossing the fourth direction DR4. Each of the light emitting areas PXA may have a diamond shape defined by the fourth direction DR4 and the fifth direction DR5.

In FIGS. 3A and 3B, the sensing patterns SP are shaded for easy distinction. Each of the sensing patterns SP includes sensing lines ML and connection patterns BP. The sensing lines ML and the connection patterns BP are disposed to overlap peripheral areas NPXA.

Each of the sensing lines ML includes lattice patterns GP and protrusion patterns MSS. The sensing lines ML extend in the first direction DR1 and are arranged to be spaced apart from each other in the second direction DR2.

A plurality of lattice patterns GP may be connected to each other in the first direction DR1 to define one sensing line. The lattice patterns GP provided in the sensing lines different from each other may be arranged to be spaced apart from each other in the second direction DR2.

Each of the lattice patterns GP includes first patterns MP1 and second patterns MP2. The first patterns MP1 extend in the fourth direction DR4. The second patterns MP2 extend in the fifth direction DR5. The first patterns MP1 and the second patterns MP2 may be alternately disposed to define one sensing line. Each of the second patterns MP2 connects two first patterns adjacent to each other. The second pattern MP2 is connected to one end of each of the first patterns MP1. The second pattern MP2 may have the other end connected to the first pattern MP1 belonging to the adjacent lattice pattern.

The protrusion patterns MSS are connected to the first patterns MP1 and the second patterns MP2, respectively. The protrusion patterns MSS may extend in a direction crossing the extension direction of the connection patterns. Thus, the protrusion patterns MSS may extend in one direction of the fourth direction DR4 and the fifth direction DR5 so as to be connected to the patterns.

The sensing lines ML adjacent to each other may define a plurality of openings TOP, which are distinguished by the connection pattern BP, therebetween. The openings TOP overlap the light emitting areas PXA. The openings TOP may surround the light emitting areas PXA. The openings TOP may extend in the fourth direction DR4 or the fifth direction DR5 between the sensing lines ML that are spaced apart from each other. The openings TOP may be connected to each other through the connection part TCP disposed between the protrusion patterns MSS facing each other.

A distance between the two adjacent sensing lines of the sensing lines ML in the second direction DR2 may be less than a maximum width between the two adjacent light emitting areas in the second direction DR2.

The connection pattern BP is disposed between the sensing lines ML to connect the sensing lines ML spaced apart from each other. The connection pattern BP may extend in the fourth direction DR4 or the fifth direction DR5. The connection pattern BP may have a length greater than a width of each of the light emitting areas adjacent thereto. Also, the connection pattern BP may have a length equal to or less than that of each of the first and second patterns MP1 and MP2.

The trace lines SL are connected to the corresponding sensing lines. The trace lines SL may be connected to the corresponding sensing lines through the connection pattern SQ. Thus, the sensing patterns SP may transmit/receive a signal to/from the touch driving unit TG through the trace lines SL. In FIG. 3A, shading of the trace lines SL and the sensing patterns SP are different for convenience of explanation.

According to an embodiment, the number of connection patterns BP disposed between the adjacent sensing lines ML may be equal to or less than about 10% of the number of sensing lines ML disposed within one sensing pattern of the sensing patterns SP. The connection patterns BP are not limited in their positions as long as the connection patterns BP are disposed to connect all of the sensing lines ML spaced apart from each other. According to the present inventive concept, since the number of connection patterns BP is equal to or less than about 10% of the number of sensing lines ML, the sensing lines ML and the trace lines SL within the sensing patterns SP may not be visually distinguished from each other when viewed from the outside.

Each of the sensing lines ML, the connection patterns BP, and the trace lines SL may include at least one of a metal, a conductive polymer, a metal nanowire, and graphene. Alternatively, each of the sensing lines ML, the connection patterns BP, and the trace lines SL may include transparent conductive oxide TCO. For example, each of the sensing lines ML, the connection patterns BP, and the trace lines SL may include at least one of transparent conductive oxide (TCO), indium tin oxide (ITO), indium zinc oxide (IZO), zinc oxide (ZnO), carbon nanotube (CNT), and graphene.

Referring to FIG. 3B, the first pattern MP1 includes a first sub pattern MP1-A and a second sub pattern MP1-B, which extend in the fourth direction DR4. The second pattern MP2 includes a first sub pattern MP2-A and a second sub pattern MP2-B, which extend in the fifth direction DR5. In FIG. 3B, for convenience of description, the adjacent patterns disposed on the sensing line are illustrated by dotted lines.

The first sub pattern MP1-A in the fourth direction DR4 may have a length WA greater than a maximum width WC of each of the light emitting areas PXA. The maximum width WC may be a distance of the diagonal of each of the light emitting areas PXA. The second sub pattern MP1-B in the fourth direction DR4 may have a length equal to that WA of the first sub pattern MP1-A.

Thus, each of the first pattern MP1 and the second MP2 may overlap at least two light emitting areas adjacent to each other in the extension direction when viewed in a direction crossing the extension direction.

For example, the first pattern MP1 may overlap the two light emitting areas PXA1 and PXA2 adjacent to each other in the fourth direction DR4 when viewed from the fourth direction DR4 to a direction T1. The direction T1 may be defined as the same direction as the fifth direction DR5 crossing the extension direction DR4 of the first pattern MP1.

The second pattern MP2 may overlap the two light emitting areas PXA1 and PXA2 adjacent to each other in the fourth direction DR4 when viewed from the fourth direction DR4 to a direction T1. The direction T1 may be defined as the same direction as the fourth direction DR4 crossing the extension direction DR5 of the second pattern MP2.

At least two light emitting areas PXA1 and PXA3 adjacent to each other in the first direction DR1 are disposed within a spaced distance WB between one end C1 and the other end C2 of the lattice pattern GP in the first direction DR1.

According to the inventive concept, at least two or more light emitting areas may be disposed to overlap each other within one pattern MP1 or MP2 constituting the lattice pattern GP to prevent the sensing lines ML within the sensing patterns SP from being seen in a line shape.

Referring to FIG. 4, each of the trace lines SL disposed between the sensing patterns SP adjacent to each other has the same shape as each of the sensing patterns SP. For example, a first line pattern CSL1 corresponds to the first pattern MP1, a second line pattern CSL2 corresponds to the second pattern MP2. Also, a line protrusion pattern CSS extending from each of the line patterns CSL1 and CSL2 may correspond to the protrusion pattern MSS. In FIG. 4, an area on which the connection patterns BP are disposed is expressed by dotted lines. According to the present inventive concept, since the trace lines SL having the same shape as the sensing lines are disposed, the sensing lines ML and the trace lines SL may be prevented from being visually distinguished from each other when seen from the outside. Thus, the electronic device having improved reliability may be provided.

According to the inventive concept, at least two or more light emitting areas may be disposed to overlap each other within one pattern constituting the lattice pattern GP to prevent the sensing lines ML and the trace lines SL within the sensing patterns SP from being visually distinguished from each other when seen from the outside.

Figure 5A:
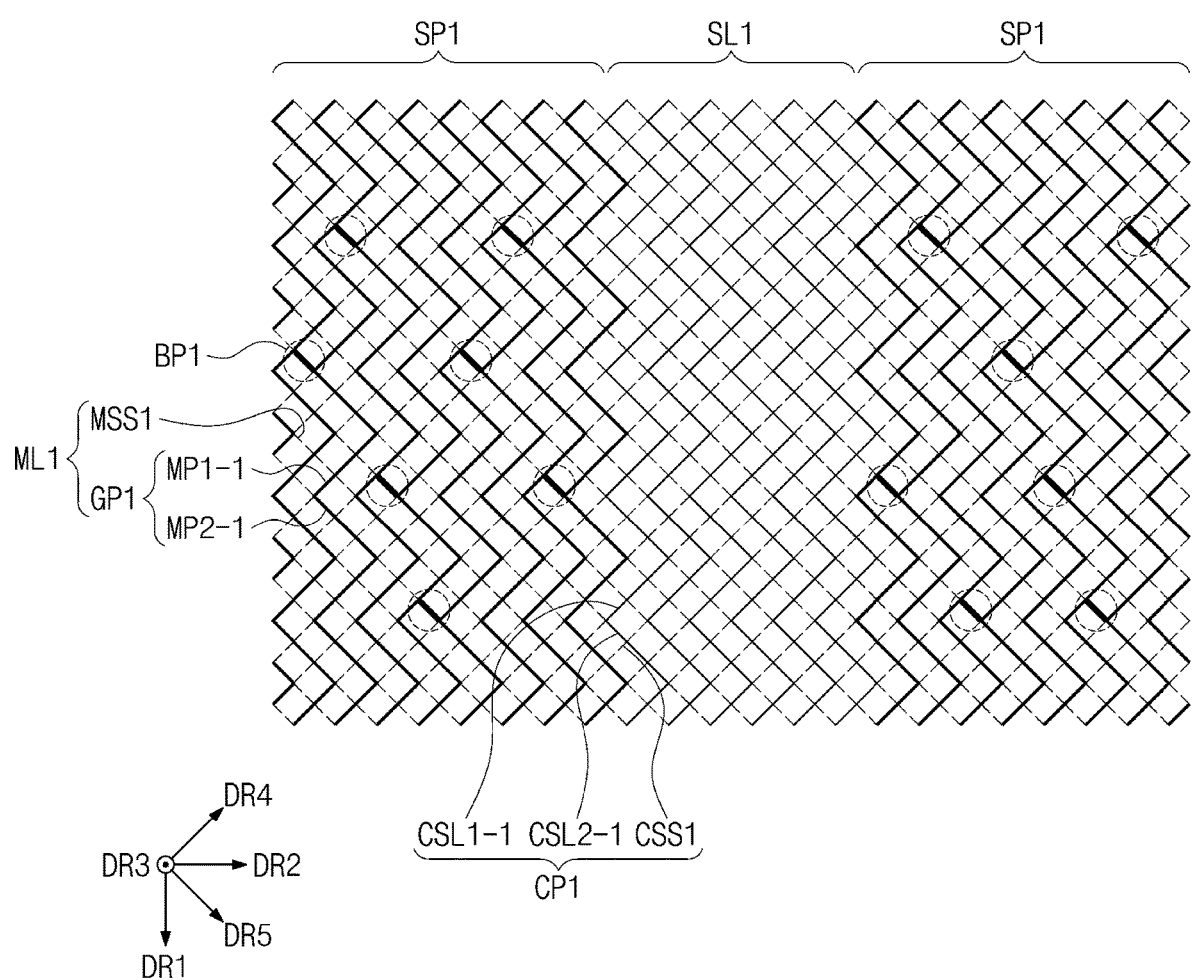
FIG. 5A is a plan view of an electronic device according to an embodiment of the inventive concept.
Figure 5B:
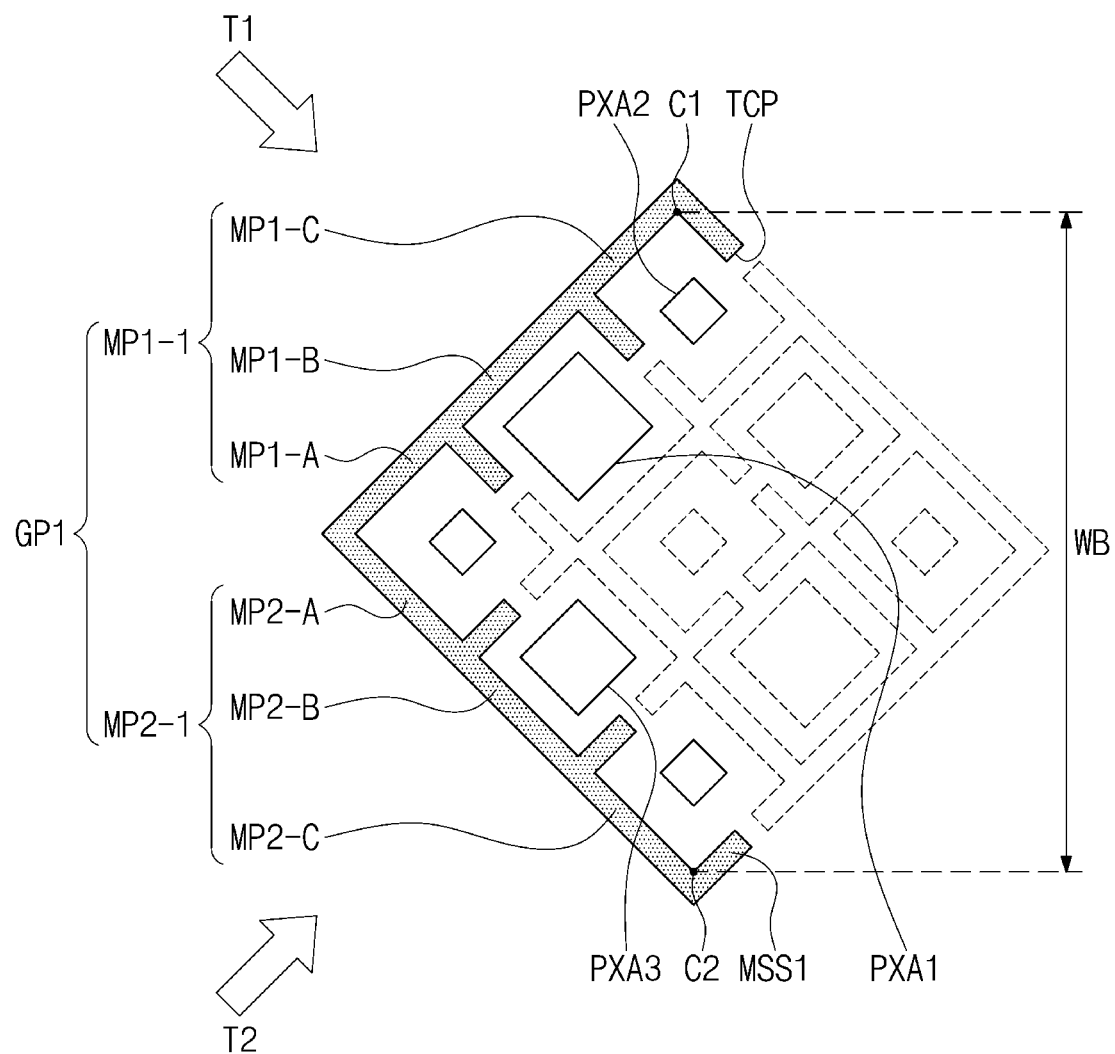
FIG. 5B is an enlarged plan view illustrating one component of the electronic device.

FIG. 5A is a plan view of an electronic device according to an embodiment of the inventive concept. FIG. 5B is an enlarged plan view illustrating one component of the electronic device. The same reference numerals are used for the same components as that of FIGS. 1 to 4, and thus, duplicated descriptions will be omitted.

Referring to FIGS. 5A and 5B, unlike the touch member SM of FIG. 4, when viewed at a first angle T1 in the fourth direction that is an extension direction of a first pattern MP1-1, the first pattern MP1-1 may overlap three light emitting areas PXA2, PXA1, and PXA2 which are adjacent to each other in the fourth direction DR4 that is an extension direction of the first pattern MP1-1. When a second pattern MP2-1 is viewed at a second angle T2 in the fifth direction DR5 that is an extension direction thereof, the second pattern MP2-1 may overlap the three light emitting areas PXA2, PXA3, and PXA2 adjacent to each other in the fifth direction DR5. In FIG. 5A, an area on which connection patterns BP-1 are disposed is expressed by dotted lines.

At least three light emitting areas PXA2, PXA2, and PXA2 adjacent to each other in the first direction DR1 are disposed within a spaced distance WB between one end C1 and the other end C2 of a lattice pattern GP1 in the first direction DR1.

The lattice patterns GP1 may be connected to each other in the first direction DR1 to define one sensing line. Also, a plurality of sensing lines ML1 disposed to be spaced apart from each other in the second direction may define one sensing pattern. FIG. 4A illustrates sensing patterns SP1 spaced part from each other and trace lines SL1 disposed between the sensing patterns SP1 spaced apart from each other.

According to an embodiment, each of the trace lines SL has the same shape as one sensing line. For example, a first line pattern CSL1-1 corresponds to the first pattern MP1-1, a second line pattern CSL2-1 corresponds to the second pattern MP2-1. Also, a line protrusion pattern CSS1 extending from each of line patterns CSL1-1 and CSL2-1 may correspond to a protrusion pattern MSS1.

Figure 6A:
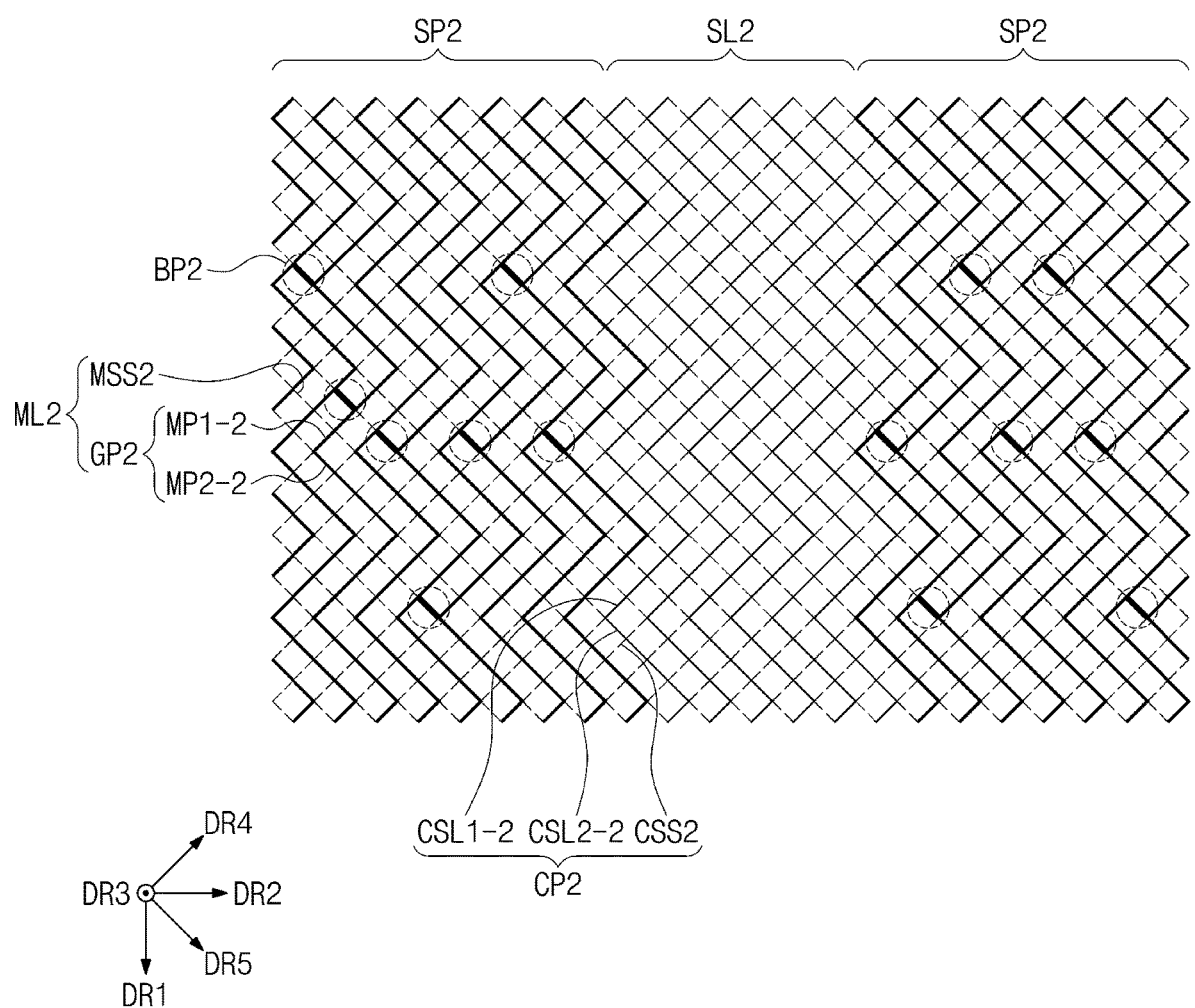
FIG. 6A is a plan view of an electronic device according to an embodiment of the inventive concept.
Figure 6B:
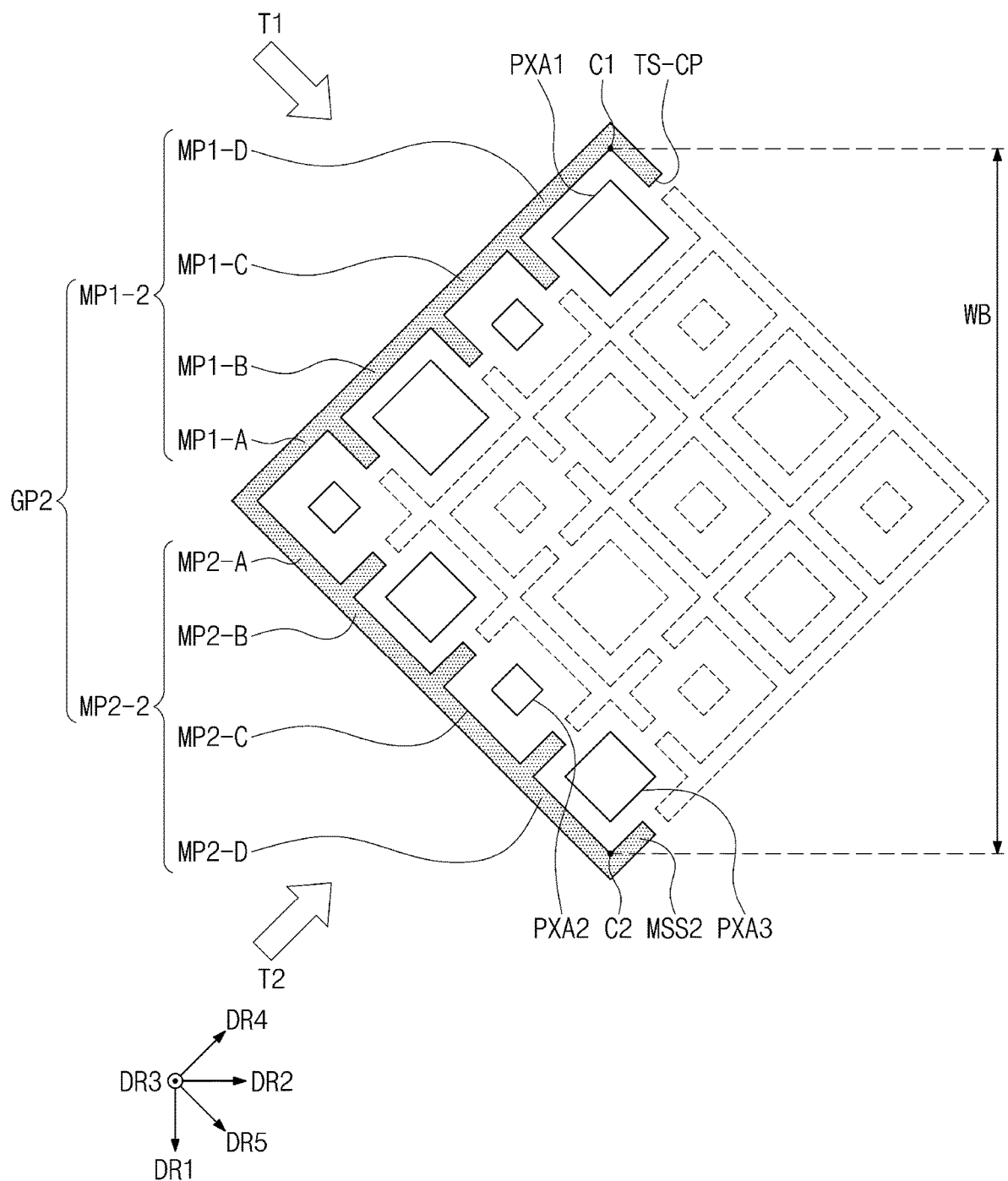
FIG. 6B is an enlarged plan view illustrating one component of the electronic device.

FIG. 6A is a plan view of an electronic device according to an embodiment of the inventive concept. FIG. 6B is an enlarged plan view illustrating one component of the electronic device. The same reference numerals are used for the same components as that of FIGS. 1 to 4, and thus, duplicated descriptions will be omitted.

Referring to FIGS. 6A and 6B, unlike the touch member SM of FIG. 5, when viewed at a first angle T1 in the fourth direction that is an extension direction of a first pattern MP1-2, a first pattern MP1-2 may overlap four light emitting areas PXA2, PXA1, PXA2, and PXA1, which are adjacent to each other in the fourth direction DR4. When a second pattern MP2-2 is viewed at the second angle T2 in the fifth direction DR5 that is an extension direction thereof, the second pattern MP2-2 may overlap the four light emitting areas PXA2, PAX1, PAX2, and PXA1 adjacent to each other in the fifth direction DR5. In FIG. 6A, a connection pattern BP-2 that are arbitrarily disposed is expressed by a dotted circle.

At least four light emitting areas PXA1, PXA3, PXA1, and PXA3 adjacent to each other in the first direction DR1 are disposed in a spaced distance WB between one end C1 and the other end C2 of a lattice pattern GP in the first direction DR1.

Lattice patterns GP2 may be connected to each other in the first direction DR1 to define one sensing line. Also, a plurality of sensing lines ML2 disposed to be spaced apart from each other in the second direction may define one sensing pattern. FIG. 6A illustrates sensing patterns SP2 spaced part from each other and trace lines SL2 disposed between the sensing patterns SP2 spaced apart from each other.

According to an embodiment, each of the trace lines SL has the same shape as one sensing line. For example, a first line pattern CSL1-2 corresponds to the first pattern MP1-2, a second line pattern CSL2-2 corresponds to the second pattern MP2-2. Also, a line protrusion pattern CSS2 extending from each of the line patterns CSL1-2 and CSL2-2 may correspond to a protrusion pattern MSS2.

According to the present inventive concept, at most four or less light emitting areas may be disposed to overlap each other within one pattern constituting the lattice pattern GP2 to prevent the sensing lines ML within the sensing patterns SP from being seen in a line shape. When five or more light emitting areas are disposed to overlap each other within one pattern, each of the patterns may increase in length to allow the patterns to be visible in the extension direction thereof. Also, an area on which the sensing patterns are disposed around a boundary between a non-active area NAA and an active area AA may be reduced, deteriorating sensing sensitivity.

Figure 7:
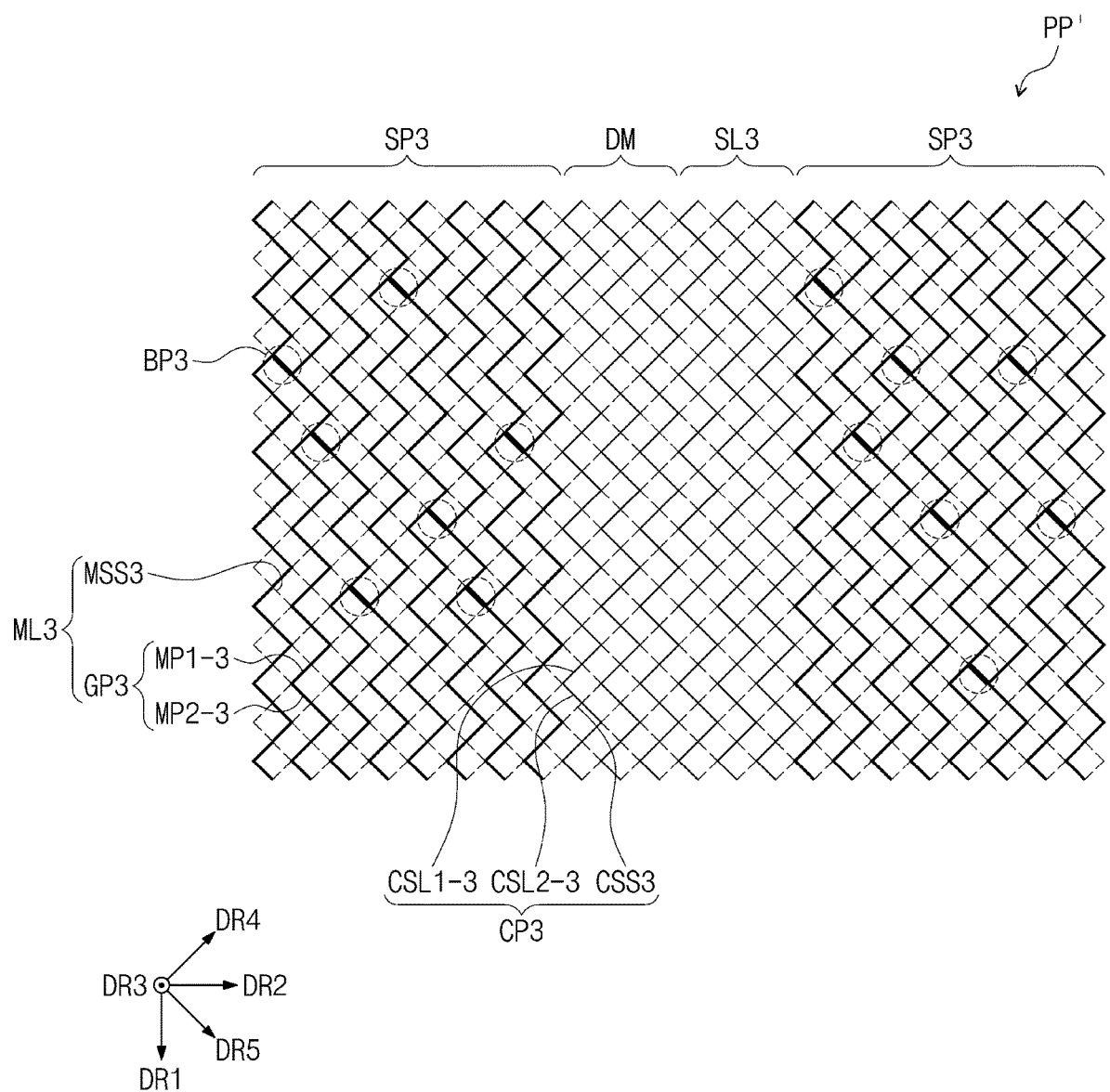
FIG. 7 is an enlarged plan view of an area PP' of FIG. 2.

FIG. 7 is an enlarged plan view of an area PP' of FIG. 2. The same reference numerals are used for the same components as that of FIGS. 1 to 4, and thus, duplicated descriptions will be omitted.

A touch member SM according to the inventive concept further includes dummy patterns DM. One dummy line, which extends in the first direction DR1, of the dummy patterns DM has the same shape as one sensing line of the sensing lines ML3. The dummy patterns DM may be floated without receiving a driving signal or voltage from the outside. The dummy patterns DM are not connected to sensing patterns SP adjacent thereto nor trace lines SL adjacent thereto.

Although the dummy patterns DM are disposed between a plurality of sensing patterns SP3 and trace lines SL3, the present inventive concept is not limited thereto. For example, the dummy patterns DM may be disposed within an active area AA except for the area in which the sensing patterns SP3 and the trace lines SL3 are disposed. The dummy patterns DM may be made of the same material as the sensing patterns SP3.

Since each of the dummy patterns DM has the same shape as each of the sensing patterns SP3 and the trace lines SL3, it may be difficult to distinguish the sensing patterns SP3 and the trace lines SL3 from each other. According to embodiments of the present inventive concept, an electronic device reduces defects in visibility are by preventing the sensing patterns SP3 and the trace lines SL3 from being visible visible.

Figure 8:
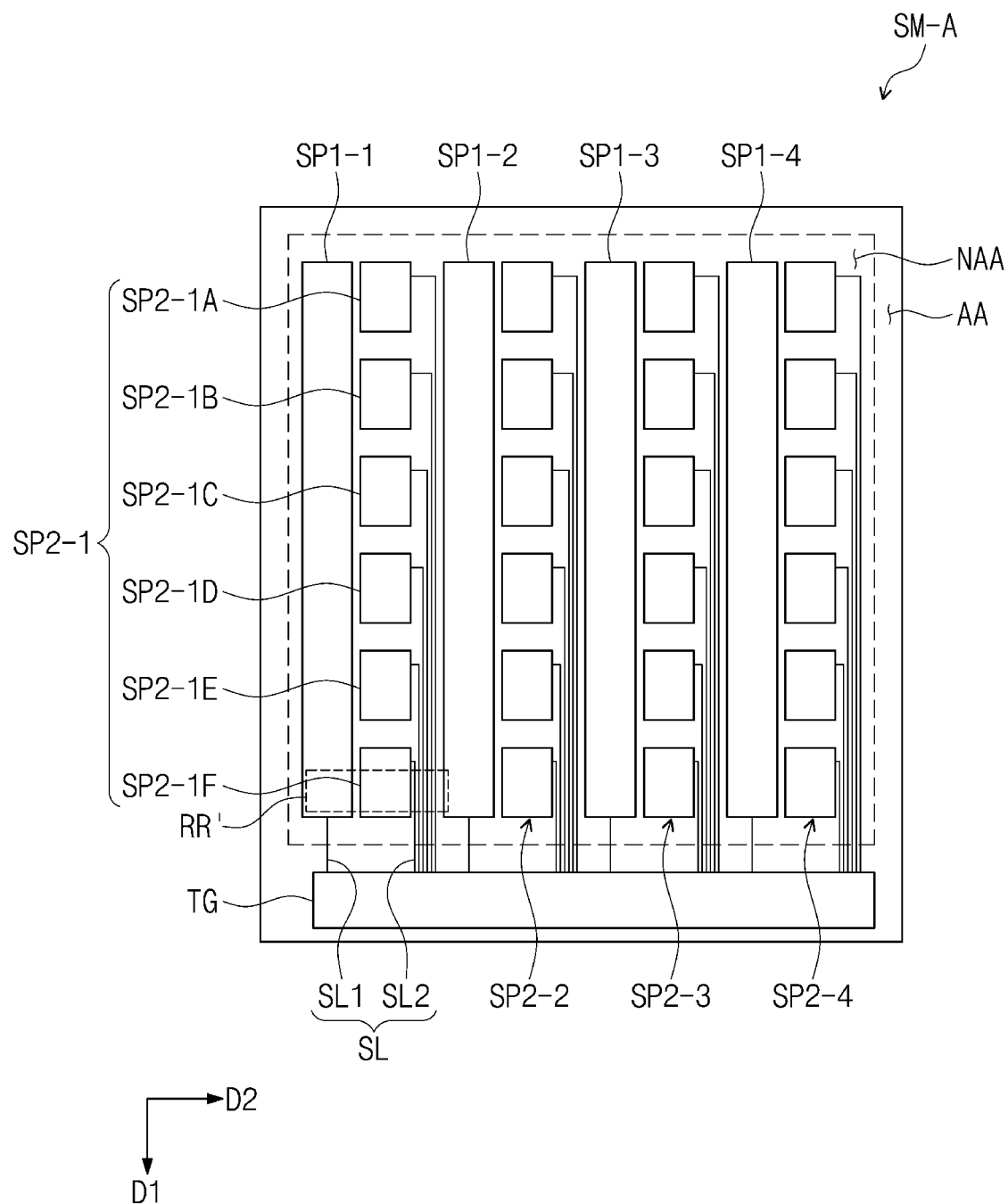
FIG. 8 is a plan view of an electronic device according to an embodiment of the inventive concept.
Figure 9:
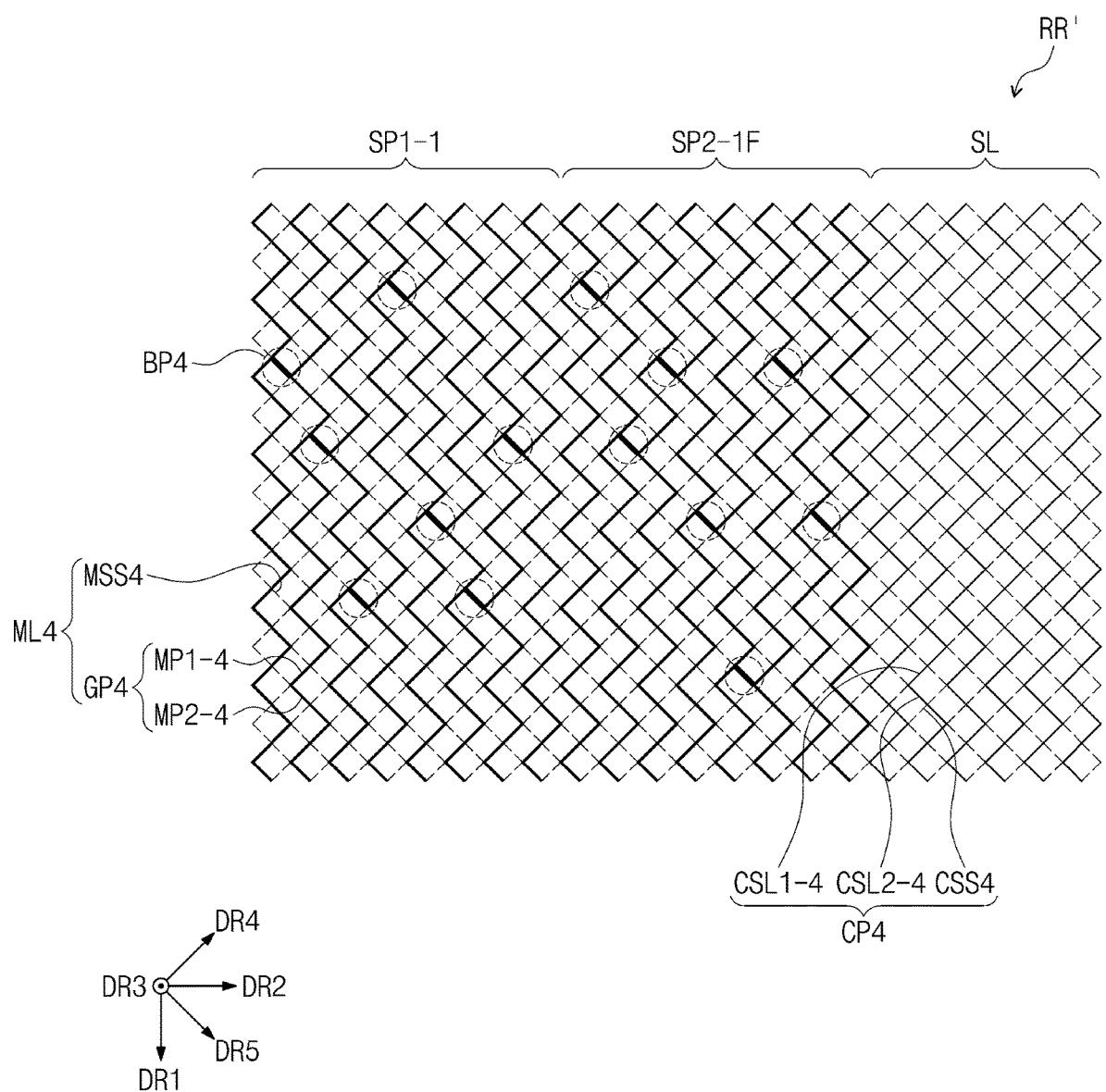
FIG. 9 is an enlarged plan view of an area RR' of FIG. 8.

FIG. 8 is a plan view of an electronic device according to an embodiment of the inventive concept. FIG. 9 is an enlarged plan view of an area RR' of FIG. 8. The same reference numerals are used for the same components as that of FIGS. 1 to 4, and thus, duplicated descriptions will be omitted.

A touch member SM-A according to an embodiment includes first sensing patterns SP1-1, SP1-2, SP1-3, and SP1-4, second sensing patterns SP2-1, SP2-2, SP2-3, and SP2-4, trace lines SL, and a sensing driving unit TG. Each of the second sensing patterns SP2-1, SP2-2, SP2-3, and SP2-4 includes sub sensing patterns SP2-1A, SP2-1B, SP2-1C, SP2-1D, SP2-1E, and SP2-1F.

The first sensing patterns SP1-1, SP1-2, SP1-3, and SP1-4 extend in the first direction DR1 and are arranged to be spaced apart from each other in the second direction DR2.

The second sensing patterns SP2-1, SP2-2, SP2-3, and SP2-4 are arranged to be spaced apart from each other in the second direction DR2 and are disposed alternately with the first sensing patterns SP1-1, SP1-2, SP1-3, and SP1-4. Each of the second sensing patterns SP2-1, SP2-2, SP2-3, and SP2-4 includes sub sensing patterns SP2-1A, SP2-1B, SP2-1C, SP2-1D, SP2-1E, and SP2-1F, which are arranged in the first direction DR1. The first sensing patterns SP1-1, SP1-2, SP1-3, and SP1-4 and the second sensing patterns SP2-1, SP2-2, SP2-3, and SP2-4 may be disposed on the same layer.

The sensing patterns may include transparent conductive oxide TCO. For example, each of the sensor patterns SP may include at least one of transparent conductive oxide (TCO), indium tin oxide (ITO), indium zinc oxide (IZO), zinc oxide (ZnO), carbon nanotube (CNT), or graphene. Alternatively, each of the sensing patterns SP may include at least one of a metal, a conductive polymer, a metal nanowire, or graphene.

The trace lines SL include first trace lines SL1 and second trace lines SL2. The trace lines SL may be connected to the corresponding sensing patterns SP.

For example, each of the first trace lines SL1 may have one end connected to the corresponding first sensing patterns SP1-1, SP1-2, SP1-3, and SP1-4. Each of the first trace lines SL1 may have the other end connected to the corresponding second sensing patterns SP2-1, SP2-2, SP2-3, and SP2-4. Each of the trace lines SL may have the other end connected to the sensing driving unit TG.

The trace lines SL may extend in the first direction DR1 and be arranged in the second direction DR2. The trace lines SL may be made of the same material as the sensing patterns SP. The trace lines SL and the sensing patterns SP are disposed on the same layer. The trace lines SL and the sensing patterns SP may be formed through the same process.

The sensing driving unit TG may input various signals for driving the touch member SM and detect the presence or absence of the sensing and sensing coordinates by using a variation in capacitance or voltage that is measured in the sensing patterns SP.

According to an embodiment of the inventive concept, a touch member SM-A may detect information of a point at which the external input TC is applied (see FIG. 1) by using mutual-capacitance.

In the mutual-capacitance manner, a variation in mutual-capacitance between the first sensing patterns SP1-1, SP1-2, SP1-3, and SP1-4 and the second sensing patterns SP2-1, SP2-2, SP2-3, and SP2-4 may be measured to recognize an external input TC. When the external input TC is applied, capacitance between the first sensing patterns SP1-1, SP1-2, SP1-3, and SP1-4 and the second sensing patterns SP2-1, SP2-2, SP2-3, and SP2-4 may vary. Thus, the variation in measured capacitance may be transmitted to the sensing driving unit TG through the corresponding trace line to detect the external input TC.

Referring to FIG. 9, one first sensing pattern SP1-1 of the first sensing patterns SP1-1, SP1-2, SP1-3, and SP1-4, one sub sensing pattern SP2-1F of one second sensing pattern SP2-1, and the trace lines SL may be disposed on an area RR'.

The first sensing pattern SP1-1 and the sub sensing pattern SP2-1F have the same shape. For example, each of the sensing patterns SP1-1 and the sub sensing pattern SP2-1F includes a plurality of sensing lines ML4 (hereinafter, referred to as connection patterns) and a plurality of connection patterns BP4 (hereinafter, referred to as connection patterns). Each of the sensing lines ML4 includes lattice patterns GP4 and protrusion patterns MSS4.

The sensing lines ML4 extend in the first direction DR1 and are arranged to be spaced apart from each other in the second direction DR2.

The plurality of lattice patterns GP4 may be connected to each other in the first direction DR1 to define one sensing line. The lattice patterns GP4 provided in the sensing lines different from each other may be arranged to be spaced apart from each other in the second direction DR2.

Each of the lattice patterns GP4 includes first patterns MP1-4 and second patterns MP2-4. The first patterns MP1-4 extend in the fourth direction DR4. The second patterns MP2-4 extend in the fifth direction DR5. The first patterns MP1-4 and the second patterns MP2-4 may be alternately disposed to define one sensing line. Each of the second patterns MP2-4 connects two first patterns adjacent to each other. The second pattern MP2-4 is connected to one end of each of the first patterns MP1-4. The second pattern MP2-4 may have the other end connected to the first pattern belonging to the adjacent lattice pattern.

The protrusion patterns MSS4 are connected to the first patterns MP1-4 and the second patterns MP2-4, respectively. The protrusion patterns MSS4 may extend in a direction crossing the extension direction of the connection patterns. Thus, the protrusion patterns MSS4 may extend in one direction of the fourth direction DR4 and the fifth direction DR5 so as to be connected to the patterns.

The connection pattern BP4 is disposed between the sensing lines ML4 to connect the sensing lines ML spaced apart from each other. The connection pattern BP4 may extend in the fourth direction DR4 or the fifth direction DR5. The connection pattern BP4 may have a length greater than a width of each of the light emitting areas. Also, the connection pattern BP4 may have a length equal to or less than that of each of the first and second patterns MP1-4 and MP2-4.

The trace lines SL are connected to the corresponding sensing lines. The trace lines SL may be connected to corresponding sensing patents. Thus, the sensing patterns may transmit/receive a signal to/from the touch driving unit TG through the trace lines SL.

According to an embodiment, the number of connection patterns BP4 disposed between the adjacent sensing lines ML4 may be equal to or less than about 10% of the number of sensing lines ML4 disposed within one sensing pattern. The connection patterns BP4 is not limited in position as long as the connection patterns BP4 are disposed to connect all of the sensing lines ML4 spaced apart from each other.

According to the inventive concept, since the number of connection patterns BP4 is equal to or less than about 10% of the number of sensing lines ML4, the sensing lines ML4 and the trace lines SL within the sensing patterns may be prevented from being visually distinguished from each other when seen from the outside. Also, the shape of the sensing line according to the inventive concept may be applied to the sensing patterns disposed on the same layer and is not limited to any one embodiment.

According to the inventive concept, it may be difficult to distinguish the sensing patterns from the trace lines, thereby improving the visibility of the electronic device.

It will be apparent to those skilled in the art that various modifications and variations can be made in the inventive concept. Thus, it is intended that the present disclosure covers the modifications and variations of this invention provided they come within the scope of the appended claims and their equivalents.

Hence, the real protective scope of the inventive concept shall be determined by the technical scope of the accompanying claims.

What is claimed is:

1. An electronic device comprising:
  a display member divided into a plurality of light emitting area spaced apart from each other on a plane and peripheral areas adjacent to the light emitting areas and comprising a plurality of display elements respectively disposed on the light emitting areas and configured to generate light; and
  a touch member disposed on the display member and configured to detect an input applied from the outside,
  wherein the touch member comprises a plurality of sensing patterns disposed to be spaced apart from each other and a plurality of trace lines respectively connected to the sensing patterns to extend in a first direction and arranged in a second direction crossing the first direction,
  wherein each of the sensing patterns comprises a plurality of sensing lines extending in the first direction and arranged in the second direction and connection patterns disposed between the sensing lines adjacent to each other to connect the sensing lines to each other,
  wherein each of the sensing lines comprises:
  a plurality of first patterns extending in a third direction crossing each of the first direction and the second direction and arranged in the first direction;
  second patterns extending in a fourth direction crossing each of the first direction, the second direction, and the third direction and disposed alternately with the first patterns in the first direction so as to be connected to the two first patterns adjacent to each other; and
  protrusion patterns respectively connected to the first patterns and the second patterns to extend in a direction crossing the extension direction of the connected patterns,
  wherein each of the first patterns and the second patterns overlaps at least two light emitting area adjacent to each other in the extension direction when viewed in a direction crossing the extension direction.

2. The method electronic device of claim 1, wherein the number of connection patterns disposed between the sensing lines adjacent to each other is equal to or less than 10% of the number of sensing lines disposed within one sensing pattern of the sensing patterns.

3. The method electronic device of claim 2, wherein the number of light emitting areas overlapping each of the first patterns and the second patterns is at most four.

4. The method electronic device of claim 2, wherein the trace lines are disposed to be spaced apart from each other in the second direction, and
  each of the trace lines has a same shape as one sensing line of the sensing lines.

5. The method electronic device of claim 2, further comprising dummy patterns overlapping the peripheral areas and disposed between the sensing patterns and the trace lines,
  wherein each of the dummy patterns has a same shape as each of the sensing lines.

6. The method electronic device of claim 1, wherein the sensing lines adjacent to each other of the sensing lines comprises a plurality of openings therebetween, which are defined by the first patterns, the second patterns, and the protrusion patterns and distinguished by the connection patterns.

7. The method electronic device of claim 6, wherein the openings surround the light emitting areas.

8. The method electronic device of claim 1, wherein the display member comprises a base layer and a pixel defining layer configured to expose the light on the base layer and disposed to be spaced apart from the light emitting areas, and
  the sensing patterns and the trace lines overlap the pixel defining layer.

9. The method electronic device of claim 1, wherein a distance between two sensing lines adjacent to each other of the sensing lines in the second direction is less than a maximum width between two light emitting areas adjacent to each other in the second direction.

10. The method electronic device of claim 9, wherein each of the first pattern comprises sub patterns, each of which has a length greater than a maximum width of one light emitting area of the light emitting areas, and
  each of the connection patterns has a length that is greater than a width of the light emitting area and is equal to or less than a length of one sub pattern.

11. The method electronic device of claim 10, wherein each of the protrusion patterns has a length that is less than half the length of the connection pattern.

12. The method electronic device of claim 1, wherein the sensing patterns are arranged in a matrix.

13. The method electronic device of claim 1, wherein the touch member detects a position of the input by using self-capacitance of each of the sensing patterns.

14. The method electronic device of claim 1, wherein the touch member is directly disposed on the display member.

15. The method electronic device of claim 14, wherein the touch member is configured to detect a position of the input by using mutual-capacitance generated by the first and second patterns.

16. The method electronic device of claim 1, wherein the sensing patterns further comprise first sensing patterns and second sensing patterns,
  wherein the first sensing patterns extend in the first direction and are arranged alternately with the second sensing patterns in the second direction.

17. An electronic device comprising:
  a display member divided into a plurality of light emitting area spaced apart from each other on a plane and peripheral areas adjacent to the light emitting areas and comprising a plurality of display elements respectively disposed on the light emitting areas and configured to generate light; and
  a touch member disposed on the display member and configured to detect an input applied from the outside, wherein the touch member comprises a plurality of sensing patterns disposed to be spaced apart from each other and a plurality of trace lines respectively connected to the sensing patterns to extend in a first direction and arranged in a second direction crossing the first direction, wherein each of the sensing patterns comprises:

a plurality of lattice patterns connected to each other in the first direction and arranged to be spaced apart from each other in the second direction; and at least one connection pattern connecting two adjacent lattice patterns of the lattice patterns to each other in the second direction, wherein each of the lattice patterns comprises a first pattern extending in a third direction crossing each of the first direction and the second direction and a second pattern extending in a fourth direction crossing the third direction and connected to one end of the first pattern in the first direction, and the lattice pattern has one end and the other end, which comprise at least two light emitting areas adjacent to each other in the first direction.

18. The method electronic device of claim 17, wherein the lattice patterns connected to each other in the first direction are defined as sensing lines, and the number of connection patterns disposed between the sensing lines adjacent to each other is equal to or less than about 10% of the number of sensing lines disposed within one sensing pattern of the sensing patterns.

19. The method electronic device of claim 18, wherein the number of light emitting patterns provided on the one end and the other end of the lattice pattern is at most four.

20. The method electronic device of claim 18, wherein the display member comprises a base layer and a pixel defining layer configured to expose the light on the base layer and disposed to be spaced apart from the light emitting areas, and the sensing patterns and the trace lines overlap the pixel defining layer.

* * * * *